May 19, 1964

M. A. MAYHEW 3,134,005

HOT WIRE FILM CUTTER

Filed Sept. 6, 1962

2 Sheets-Sheet 1

INVENTOR
MYRON A. MAYHEW

BY

ATTORNEY

May 19, 1964  M. A. MAYHEW  3,134,005
HOT WIRE FILM CUTTER
Filed Sept. 6, 1962  2 Sheets-Sheet 2

INVENTOR
MYRON A. MAYHEW
BY E. Janet Berry
ATTORNEY

United States Patent Office 3,134,005
Patented May 19, 1964

3,134,005
HOT WIRE FILM CUTTER
Myron A. Mayhew, Rochester, N.Y., assignor to National Distillers and Chemical Corporation, New York, N.Y., a corporation of Virginia
Filed Sept. 6, 1962, Ser. No. 221,910
4 Claims. (Cl. 219—19)

This invention relates to packaging and more particularly to a dispenser for relatively thin thermoplastic films and by means of which a desired length may be easily, safely and efficiently severed from a roll thereof.

The use of thermoplastic polyolefin films, such as polyethylene, and the like, for packaging merchandise has become widespread. Such use has included the wrapping of merchandise of varying characteristics, sizes and shapes by an operator. One of the problems in the use of film for packaging has been the severance of a desired length from a supply roll thereof. Installations in which a hand cutting tool, or the like, has been employed require the operator to pick up the instrument each time, thereby delaying his application of the wrapping. Furthermore, the use of a manual cutting tool requires skill in order to obtain an even cut in a minimum of time.

Various arrangements have been employed in which the cutting instrument is mounted. However, these oftentimes have been difficult to use or have presented a hazard to the operator. Further, the inherent characteristics of film of the character with which we presently are concerned provide problems in handling and with the wrapping of packages of varying sizes the provision of predetermined separate lengths is far from economical.

Accordingly, it is an object of the present invention to provide a dispenser and cutter for thin plastic film by means of which an operator may withdraw a desired length thereof from a roll or other source of supply, and quickly, efficiently and safely detach such length in accordance with each successive wrapping requirement.

Figure 1:
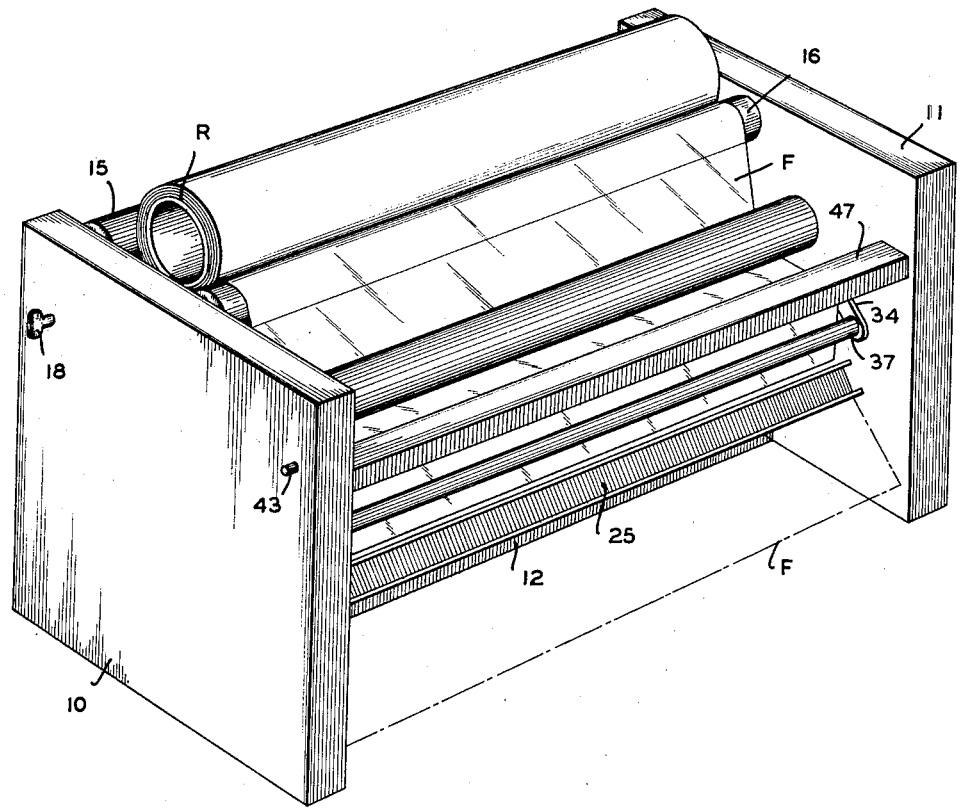
Figure 5:
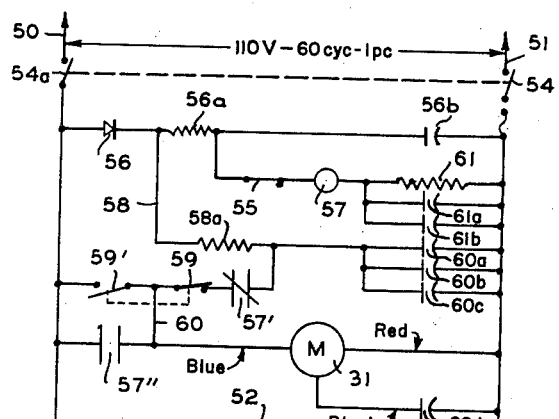
Figure 5:
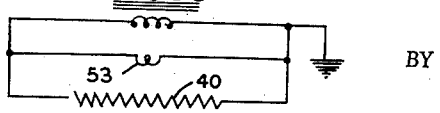
Figure 2:
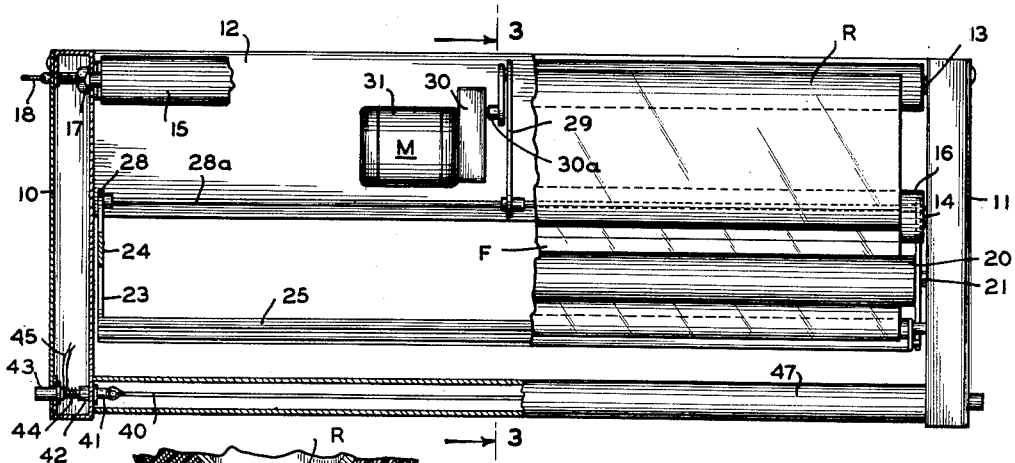
Figure 3:
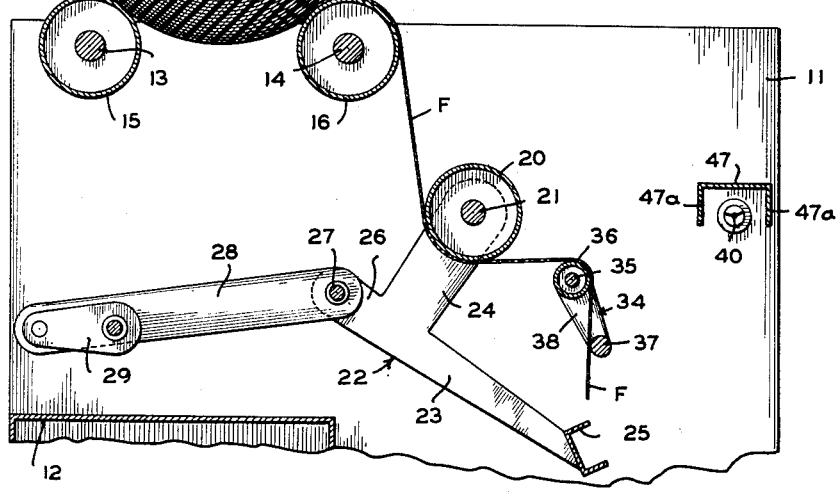
Figure 4:
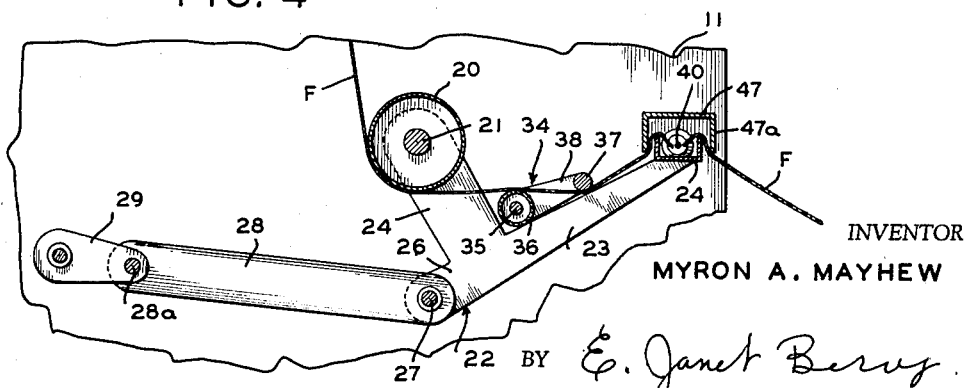

These and other objects of the invention will become apparent from the following description taken in conjunction with the accompanying drawing, wherein:

FIGURE 1 is a perspective view of apparatus constructed in accordance with the present invention, FIGURE 2 is a plan view, partly in section, of such apparatus, FIGURE 3 is a fragmentary sectional view on an enlarged scale taken on the line 3—3 of FIGURE 2, FIGURE 4 is a fragmentary view similar to FIGURE 3 and illustrating the film lifting mechanism in raised position; and FIGURE 5 is a circuit diagram of electrical components by means of which the apparatus of the present invention may be operated.

Briefly stated, the present invention includes a support for film stock, guide rollers and film positioning means for holding the film in position for use, a film lifter shiftable from an inactive position during the period in which the operator pulls the desired length of film from the stock to an active position in which the web of the film is raised by the film lifter into engagement with a shielded hot wire, thereby severing the end portion, and operating means for the film lifter, such operating means being operator-controlled and permitting operation of only one cycle of the machine at a time, thereby substantially decreasing any possibility of injury hazard to the operator.

With further reference to the drawings, the embodiment of the invention illustrated includes a pair of box type side panel members 10 and 11 connected at their lower rear portions by an electrical components housing 12 which is indicated fragmentarily in FIGURE 3. Mounted intermediate the upper portion of the panels are a pair of parallel spaced shafts 13 and 14 secured in any desired manner and on which rollers 15 and 16 are mounted by suitable anti-friction means such as roller bearings. The rear roller 15 preferably is engaged by a brake 17 adjustably urged inwardly by a thumb screw or the like 18.

Mounted upon the rollers 15 and 16 is a supply roll R of thermoplastic film F which feeds over and around a portion of the roller 16.

Mounted intermediate the side panels 10 and 11, and at a lower level than the rollers 15 and 16 and slightly forwardly of the roller 16, is a guide roller 20 also desirably supported by suitable anti-friction means on a shaft 21. Pivotally mounted upon shaft 21 is a film lifter indicated generally at 22 and having a longitudinal main or foot portion 23 to which upright brackets 24 are connected, as illustrated more particularly in FIGURE 3, thereby permitting swingable movement of the main portion 23 of the film lifter. The forward or toe extremity of the main portion 23 of the lifter has secured thereto one extremity of a transversely disposed and elongated channel portion 25 adapted to engage the film when a length is pulled off of the roll by an operator. The other extremity or heel 26 of the lifter is pivotally attached at 27 to a connecting rod 28 which, in turn, is pivotally connected at 28a to the crank arm 29. The crank arm 29 is driven through gear box 30 by a motor 31.

In order to position the free end of the film for ready grasping by an operator a film locator or gate 34 is pivotally mounted by a shaft 35 between the panels 10 and 11 at a level desirably immediately below the roller 21 and toward the front of the dispenser. The film locator 34 may include a roller 36 rotatably mounted on the shaft 35 and a rod 37 spaced therefrom by a pair of brackets 38.

Also mounted intermediate the side panels 10 and 11 is a cutter assembly including a high resistance element such as a knife or wire 40 having its ends connected to a rod 41 which slidably passes through bushing 42 in the inner wall of the side panel 10. At its opposed extremity, the rod 41 is provided with a cap 43. Intermediate the cap and the bushing a spring 44 tends to urge the cap and attached rod outwardly in order to maintain appropriate tension on the wire 40 and suitable electrical leads 45 are connected to the rod 41. Preferably, the wire 40 is mounted at approximately the level of the shaft 21 and forwardly of the locator 34. In order to shield the wire against inadvertent contact, a channel shaped guard 47 is mounted intermediate the side panels 10 and 11; this guard embraces the wire and its sides 47a depend downwardly.

The film lifter 22 is so arranged that rotation of the crank 29 produces an oscillatory motion of the lifter from a position as indicated in FIGURE 3 to that disclosed in FIGURE 4. In the latter position the web of film is lifted into engagement with the wire 40, the channel portion 25 being received within the channel housing of the guard 47, and the locator 34 being raised by the lifter in such position. Continued rotation of the crank arm 29 causes retraction of the lifter back to the inoperative position of FIGURE 3.

In the operation of the device, the operator grasps the free end of the film indicated as positioned beneath the film locator 34 as illustrated more particularly in FIGURE 3 and pulls a desired length from the roll F. In order to sever such length, the operator actuates a suitable switch, foot pedal, or the like, to operate the motor 31 and reducer output shaft 30A (see FIG. 2) thru a single revolution, thereby causing the film lifter to raise the web of film into engagement with the hot knife or wire 40, thereby severing the film, whereupon the mechanism returns to the inoperative position of FIGURE 3 and successive additional lengths may be detached as desired.

Various controls for rotating the crank arm 29 a single cycle upon actuation of a switch by the operator may be employed.

An example of such control is indicated in FIG. 5. In this figure the main supply lines 50 and 51 are connected to transformer 52 by means of which the hot wire 40 and a signal light 53 are energized when the main switches 54 and 54a are closed. Across the lines 50 and 51 a foot switch 55 is connected through rectifier 56 and coil 57 of a suitable relay. Hence, by depressing the switch 55 the operator energizes the relay coil 57. A branch line 58 is connected intermediate the rectifier 56 and switch 55 and is connected to a normally closed switch 57' of the relay to a microswitch 59 mechanically connected to a second switch 59', the other side of which is connected to the line 50. Between the lines 50 and 51 a normally open switch 57" of the relay is connected to one side of the motor 31 the other side of which is connected to the line 51. Intermediate the switch 57" and the motor 31 a branch line 60 extends to the line between switches 59 and 59'.

In employment of the apparatus described, the following sequence of operations take place:

Power Switch

When the power supply switch 54 is closed, power is supplied to the primary coil of transformer 52. The secondary coil of the transformer supplies alternating current to both the light 53 and the hot wire 19. At the same time, through the rectifier 56 and the resistor 56a, the capacitor 56b is charged. Also through the rectifier 56 and through the resistor 58a a low direct current voltage is supplied to the motor field (blue wire) through relay contact 57" and limit switch 59 and also to capacitors 60a, 60b and 60c.

Foot Switch

When the foot switch 55 is closed, the two capacitors 61a and 61b are charged from capacitor 56b through the relay coil 57. During the time capacitors 61a and 61b are charging, relay coil 57 is energized. As soon as the difference in voltage between capacitor 56b and capacitors 61a and 61b reaches the drop-out voltage of relay coil 57, it de-energizes. During the time the relay coil 57 is energized, relay contacts 57" close and contacts 57' open.

The closing of relay contact 57" supplies an alternating current voltage to the motor, causing it to turn. The opening of relay contact 57' removes the low direct voltage from the motor field.

Motor Cycle

The initial motion of the motor reducer output shaft causes limit switch 59' to close and limit switch 59 to open. At approximately the same time, relay coil 57 will be de-energized, causing the relay contacts 57" and 57' to return to the condition shown in the drawing.

During one revolution of the motor reducer output shaft, capacitors 60a, 60b, and 60c are charged. At the end of this one revolution of the output shaft, limit switch 59' opens, thus removing the alternating voltage from the motor. Limit switch 59 closes, at this time, and discharges capacitors 60a, 60b and 60c to the motor field which acts as a brake.

Circuit Re-Set

When the foot switch 55 is opened, the voltage of capacitors 61a and 61b discharges through the resistor 61, requiring approximately one second to complete. This portion of the circuit acts as a timing device which will prevent inadvertent operation of the motor. Should the foot switch remain closed the equipment will not recycle automatically. It is necessary that the voltage capacitors 61a and 61b be discharged before the cycle is complete. Then upon re-charging these same capacitors, as previously described, the relay coil 57 is energized which, in turn closes relay contact 57" thus permitting the motor to operate.

Accordingly, it will be understood that the invention includes film supports and guiding devices and a lifter for moving the web of film into engagement with a severing device, such severing device having a guard, and the film lifter returning to its initial position with the end of the film maintained in ready position for grasping by an opertaor.

There has thus been described a novel dispensing device, and method of operation, whereby successive lengths of thermoplastic film may be detached readily and automatically from a supply roll thereof. It will be understood that various changes may be made by those skilled in this art to the structural embodiment illustrated and therefore the invention is not considered limited by that which is shown in the drawings and described in the specification and reference is had to the claims for summaries of the novel features of the invention and of the novel combinations of parts and features of construction and method of operation for all of which protection is desired.

What is claimed is:

1. A plastic film dispenser and cutter comprising a pair of spaced rotatably mounted parallel support rollers, a guide roller mounted at one side of and below the level of said support rollers, a film lifter, said film lifter having a depending portion mounted coaxially with said guide roller and a foot portion, said foot portion having a film engagement channel at its toe end and a connecting rod pivotally connected at its heel end, crank means connected to the connecting rod for driving the same, means for driving the crank means, a film gate mounted adjacent to the upper portion of said foot portion, said film gate comprising guide means for the film, a high resistance wire mounted adjacent to said film lifter, and a guard mounted adjacent to said wire, said film engagement channel being receivable within said guard, said film lifter being shiftable by said crank means and connecting rod from a position remote from said wire to a position in which film which is unwound from stock supported on said support rollers and passes around said guide roller and between the spaced portions of the film gate is lifted into engagement with said wire.

2. A film dispenser and severing device comprising film support means, film guiding means and film positioning means, a film lifter, said film positioning means being mounted adjacent to said film lifter, said film lifter being shiftable from a retracted to a raised position, said lifter carrying an upwardly facing channel member mounted adjacent the forward extremity thereof engageable with film when the lifter is raised, thereby draping the film thereacross, and a cutter wire mounted adjacent to said lifter, a guard over said cutter wire, said upwardly facing channel member being receivable within said guard for bringing the film into engagement with the wire.

3. The invention of claim 2, including means for operating said lifter, said means comprising a crank arm having an end pivotally connected to said lifter remote from its channel means, means for rotating said crank arm to cause one cycle of operation of said film lifter, said means comprising a motor, energizing means connected to said motor, switch means for controlling the application of said energizing means, and means permitting the operation of said lifter through no more than a single cycle with each operation of said switch means.

4. A film dispensing and severing device comprising film support means, film guiding means and film positioning means, a film lifter positioned adjacent said film positioning means and shiftable from a retracted to a raised position, said film lifter including a foot portion having an elongated upwardly directed film engaging channel at its toe extremity engageable with film when the lifter is raised and a connecting rod pivotally attached to its heel extremity, a crank arm connected to the remote extremity of said connecting rod for driving the same, means for rotating said crank arm to cause one cycle of operation of said film lifter, said means comprising a motor, energizing means connected to said motor, switch means for controlling the application of said energizing means, means permitting the operation of said lifter through no more than a single cycle with each operation of said switch means, a cutter wire mounted adjacent to said film lifter, and an elongated downwardly directed channel cutter wire guard of greater width than said film engaging channel over said cutter wire, said lifter means being receivable within said cutter wire guard for bringing the film into engagement with said cutter wire to sever a length of film.

References Cited in the file of this patent
UNITED STATES PATENTS

| | | |
|---|---|---|
| 2,226,413 | Schwimmer | Dec. 24, 1940 |
| 2,929,907 | Collins | Mar. 22, 1960 |
| 2,987,598 | Chase et al. | June 6, 1961 |
| 3,026,397 | Wolze | Mar. 20, 1962 |